US011136275B2

(12) United States Patent
Merritt

(10) Patent No.: US 11,136,275 B2
(45) Date of Patent: Oct. 5, 2021

(54) PROCESS FOR MAKING A COMPOSITE GRANULE WITH ROCK PHOSPHATE, SULFUR, AND HUMIC ACID

(71) Applicant: Kevin Merritt, St. Augustine, FL (US)

(72) Inventor: Kevin Merritt, St. Augustine, FL (US)

(*) Notice: Subject to any disclaimer, the term of this patent is extended or adjusted under 35 U.S.C. 154(b) by 116 days.

(21) Appl. No.: 16/387,131

(22) Filed: Apr. 17, 2019

(65) Prior Publication Data
US 2020/0270183 A1    Aug. 27, 2020

Related U.S. Application Data

(63) Continuation-in-part of application No. 16/210,646, filed on Dec. 5, 2018, which is a continuation-in-part of application No. 15/878,773, filed on Jan. 24, 2018, now Pat. No. 10,597,337, which is a continuation-in-part of application No. 14/738,865, filed on Jun. 13, 2015, now Pat. No. 9,914,670.

(60) Provisional application No. 62/013,789, filed on Jun. 18, 2014.

(51) Int. Cl.
C05F 11/02    (2006.01)
C05B 17/00   (2006.01)
C05F 11/08    (2006.01)
C05D 9/00     (2006.01)
C05B 19/00   (2006.01)
C05G 5/12     (2020.01)

(52) U.S. Cl.
CPC .............. C05F 11/02 (2013.01); C05B 17/00 (2013.01); C05B 19/00 (2013.01); C05D 9/00 (2013.01); C05F 11/08 (2013.01); C05G 5/12 (2020.02)

(58) Field of Classification Search
CPC . C05F 11/02; C05F 11/08; C05G 5/12; C05B 17/00; C05B 19/00; C05D 9/00
See application file for complete search history.

(56) References Cited

U.S. PATENT DOCUMENTS

| 2,992,093 | A | 7/1961 | Burdick |
| 3,700,728 | A | 10/1972 | Moschopedis et al. |
| 3,932,166 | A | 1/1976 | Vignovich et al. |
| 4,015,972 | A | 4/1977 | Watkins et al. |
| 4,459,149 | A | 7/1984 | Moran et al. |
| 5,026,416 | A | 6/1991 | Alexander |
| 5,034,045 | A | 7/1991 | Alexander |
| 5,876,479 | A | 3/1999 | Hedgpeth |
| 6,783,567 | B1 | 8/2004 | Waters |
| 8,388,722 | B2 | 3/2013 | Lynch et al. |
| 9,914,670 | B1 | 3/2018 | Merritt |
| 10,597,337 | B1 | 3/2020 | Merritt |
| 10,723,667 | B1 | 7/2020 | Merritt |
| 2005/0039509 | A1 | 2/2005 | Muma |
| 2008/0216534 | A1 | 9/2008 | Karr |
| 2011/0259067 | A1 | 10/2011 | Lynch |
| 2013/0239633 | A1 | 9/2013 | Halos |
| 2016/0200634 | A1 | 7/2016 | Zaseybida |
| 2016/0229761 | A1 | 8/2016 | Cherry et al. |
| 2017/0334795 | A1 | 11/2017 | Cherry et al. |
| 2018/0311712 | A1 | 11/2018 | Le |
| 2020/0148952 | A1 | 5/2020 | Merritt |

FOREIGN PATENT DOCUMENTS

| CN | 1026095 C | 10/1994 |
| CN | 101024590 B | 11/2010 |
| CN | 101905983 A | 12/2010 |
| CN | 202148263 U | 2/2012 |
| CN | 101768019 B | 12/2012 |
| CN | 102898254 A | 1/2013 |
| CN | 102942417 | 2/2013 |
| CN | 101935243 B | 7/2013 |
| CN | 102875248 B | 10/2014 |
| CN | 104892296 A | 9/2015 |
| EP | 1216976 A2 | 6/2002 |
| IN | 02359CH2010 | 9/2010 |
| RU | 2443663 C1 * | 2/2012 |
| RU | 2491266 C1 | 1/2013 |
| WO | 9533702 A1 | 12/1995 |
| WO | 2010094985 A1 | 8/2010 |
| WO | 2013057168 A2 | 4/2013 |

OTHER PUBLICATIONS

Degryse, Fien, et al. "Uptake of elemental or sulfate-S from fall-or spring-applied co-granulated fertilizer by corn—A stable isotope and modeling study." Field crops research 221 (2018): 322-332.*
Baloach, et al. "Integrated effect of phosphate solubilizing bacteria and humic acid on physiomorphic attributes of maize." International Journal of Current Microbiology and Applied Sciences 3.6 (2014): 549-554.*
Lindenmayer, R. "Zinc Fertilization: A Review of Scientific Literature." (2007).*
Jacob, Kenneth Donald, et al. The composition and distribution of phosphate rock with special reference to the United States No. 1488-2016-124804. 1933.
Saint Humic Acid "Potassium humate technical data sheet" <https://www2.slideshare.net/SAINTHUMICACID/potassium-humate-technical-data-sheet-81883698> Nov. 11, 2017 (Year: 2017).
IPCO "Rotoform pastillation for sulphur bentonite" <https://ipco.com/wp-content/uploads/2018/03/IPCO_IP_Sulphur-Bentonite_2018.pdf> Mar. 2018 (Year: 2018).
Wang et al., Evaluation of Methods of Determining Humic Acids in Nucleic Acid Samples for Molecular Biological Analysis, Biosci. Biotechnol. Biochem., 75(2), 355-357, 2011.
AGN Microbial Selection and Sub-Profiling, Cisbay, www.cisbay.com.

(Continued)

Primary Examiner — Jennifer A Smith
(74) Attorney, Agent, or Firm — Middleton Reutlinger

(57) ABSTRACT

A potassium humate, rock phosphorous, sulfur granule: a fully soluble potassium humate component comprising about 3% of the composite granule; a sulfur component comprising about 15% of the composite granule; and a rock phosphate powder component comprising about 82% of the composite granule. The composite granule is semi-soluble and has a pH of 2.5 to about 12.

16 Claims, No Drawings

(56) References Cited

OTHER PUBLICATIONS

Van Zomeren, Measurement of Humic and Fulvic Acid Concentrations and Dissolution Properties by a Rapid Batch Procedure, Environ. Sci. Technol., 41 (19), pp. 6755-6761, 2007.
Babalola, Beneficial bacteria of agricultural importance, Biotechnol Lett, 32, 1559-1570, 2010.
Comans et al., Concentrations of total dissolved organic carbon and humic and hydrophilic sub-fractions extracted from major Dutch soil types and their relation with soil properties, Geophysical Research Abstractsvol. 15, EGU2013-13841, 2013.
Grow More; Humic/Fulvic Acids, pp. 1-7, Dec. 31, 2003.
Halliday, The relationship between Humalite, Leonardite, and Fertilizers, Black Earth, 2015.
Humic Growth Solutions; Diamond-Grow Organic 100% Water Soluble Spray Dried Humic Acid Powder, pp. 1-2, Jacksonville, FL Dec. 31, 2013.
Topp, Bacteria in agricultural soils: Diversity, role and future perspectives, Canadian Journal of Soil Science, 83, 303-309, 2003.
Javanshah et al., Determination of Humic Acid by Spectrophotometric Analysis in the Soils, International Journal of Advanced Biotechnology and Research (IJBR), vol. 7, pp. 19-23, Special Issue—Apr. 2016.
Lamar et al., A New Standardized Method for Quantification of Humic and Fulvic Acids in Humic Ores and commercial Products,Journal of AOAC International, 97, 721-730, 2014.
Mineral Logic, LLC, Bioactive Fulvic, Testing Method, Natural Organic Matter Research, 2017.
Myneni, Functional Group Chemistry of Humic Substances, Molecular Environmental Geochemistry Group, The Department of Geosciences, Princeton University, Guyot Hall Princeton, NJ 08544.
Hiroyuki, Interactions of Methylotrophs with Plants and Other Heterotrophic Bacteria, Microorganisms 2015, 3, 137-151; doi: 10.3390/microorganisms3020137, www.mdpi.com/journal/microorganisms, Apr. 2, 2015.
Canadian Patent Application 3,070,820 filed Feb. 4, 2020 titled Potassium Humate Sulfur Compound Granule.
Canadian Patent Application 3,077,954 filed Apr. 15, 2020 titled Process for Making a Composite Granule With Rock Phosphate, Sulfur, and Humic Acid.
"Environmental Fertilisers. ""EF Soluble Humate Granules""". pp. 1-2. <http://environmentalfertilisers.co.nz/ef-soluble-humate-granules/ > Jun. 21, 2013.".
Humic DG Product Label, 2016.
Mexican Patent Application MX/A/2020/001397 filed Feb. 4, 2020 titled Potassium Humate Sulfur Compound Granule.
Mexican Patent Applicantion MX/a/2020/004003 filed Apr. 20, 2020 titled Process for Making a Composite Granule Nith Rock Phosphate, Sulfur, and Humic Acid.
Sharma, A. K., Seema Wahab, and Rashmi Srivastava, eds. Agriculture diversification: problems and perspectives. IK International Pvt Ltd, 2010.
The Andersons. Products—Andersons Humates | Humic DG. <https://andersonshumates.com/products/ > May 21, 2013.
Wikipedia. "Potassium humate". <https://en.wikipedia.org/wiki/Potassium_humate> Mar. 7, 2013.
U.S. Appl. No. 16/210,646, filed Dec. 5, 2018 titled Process for Making a Semi-Soluble Granule comprising Rock Phosphate and Humic Acid.
U.S. Appl. No. 16/814,539, filed Mar. 10, 2020 titled Process for Making a Fully Water-Soluble Granule Comprising Humic Acid and a Microbial Community Composition.
U.S. Appl. No. 16/924,856, filed Jul. 9, 2020 titled Potassium Humate Zinc Sulfate Compound.
U.S. Appl. No. 17/206,053, filed Mar. 18, 2021 titled Process for Making a Semi-Soluble Humic Granule.
United States Patent Office, Notice of Allowance in U.S. Appl. No. 16/210,646 dated Apr. 1, 2021.
Huey, Lee J., Osumanu H. Ahmed, and Nik MA Majid. "Effects of Extractants on the Yields and Selected Chemical Characteristics of Humic Acids Isolated from Tropical Saprists Peat." American Journal of Applied Sciences 7.7 (2010): 933. (Year: 2010).
United States Patent Office, Non-Final Office Action in U.S. Appl. No. 16/814,539, dated Jul. 26, 2021.
Granular Myco (GreenGro Biologicals) <https:/www.thegreengro.com/product/granular-myco/> Oct. 23, 2017 (Year: 2017).
Premium Ultrafine (GreenGro Biologicals) <https://www.thegreengro.com/product/premium-ultrafine/> 2017 (Year: 2017).
Maxwell. "HumiMax" <https://d2j31icv6dlhz6.cloudfront.net/O/16EACbqUqFlemViO7sUS/maxwell-humimax-eaflet-2019 pdf> 2019 (Year: 2019).
Fulton, John, and Kaylee Port. "Physical properties of granular fertilizers and impact on spreading." Ohio State University, FABE-550.1 (2016). (Year: 2016).

* cited by examiner

PROCESS FOR MAKING A COMPOSITE GRANULE WITH ROCK PHOSPHATE, SULFUR, AND HUMIC ACID

FIELD OF THE INVENTION

A process such as is described in various embodiments herein relates to a process for making a composite granule comprising rock phosphate, sulfur, humic acid, and, optionally, a dormant microbial community composition. Such a granule is useful as an organic aid to crop growth.

BACKGROUND OF THE INVENTION

Extraction of humic acid and related materials from carbonaceous raw materials (e.g. Humalite, Leonardite, Sub-Bituminous Coal, Menefee, Peat, and the like) has been practiced for years and is accordingly known in the art. Process steps vary, but the process output is generally a particulate material with suboptimal solubility in water.

It is also well documented that phosphorus is beneficial in agriculture and/or on plant growth. Phosphorus plays a role in a number of important cellular functions of plants, including but not limited to, photosynthesis, respiration, energy storage and transfer, etc. Phosphates are critical to DNA and RNA, and are additionally a component of adenosine triphosphate (ATP) which is the "energy unit" of plants. In some instances, rock phosphate, also known as phosphorite or phosphate rock, is a non-detrital sedimentary rock with large amounts of phosphate minerals may be used as a source of phosphorous for plants.

Furthermore, various soil and tissue analyses have indicated there is a lack of ample sulfur in many agricultural soils. Sulfur plays a distinctive and visible role in protein synthesis, producing amino acids, enzymes, and vitamins. Sulfur also helps soils fortify plant resistance to disease. Therefore, it may be desirable to combine potassium humate, phosphorous, and sulfur into a granule for application to soil. The combinatorial chemistry of the potassium humate and sulfur may serve as a catalyst for the production of sulfates and sulfuric acids and construct a sulfur reserve within the soil.

It is also known that microbial organisms provide a wide array of beneficial ecosystem services, especially with respect to plant growth and nutrient availability. In particular, it is known that certain bacteria (e.g. plant growth-promoting rhizobacteria) are of agricultural importance for promoting plant growth, suppression of disease-causing organisms, and beneficially altering nutrient availability in the soil. Furthermore, it is known that the combination of humic acid and microbial organisms may provide a broad range of benefits to the soil. Conventionally, humic acid and microbial organisms are either applied to the soil separately or combined and applied in liquid or soluble powder form. Separate application has the primary disadvantage of requiring an additional application step; whereas, use of a liquid form has the primary disadvantages of being difficult to transport and having a shortened shelf life.

Finally, it is known that zinc is among the micronutrients that plants require to grow efficiently, as, for example, since is an essential component of various enzymes involved in metabolic reactions. Zinc deficiencies may result in a decrease in crop productivity. It is for this reason zinc may be utilized as a part of agricultural fertilizers.

Because organic and other producers typically prefer to apply mixtures that are safe and healthful for both plants and workers, there is a need in the art for a process for making a granule comprising some combination of rock phosphate, humic acid, sulfur and/or a microbial community composition.

SUMMARY OF EMBODIMENTS

The herein-described embodiments address these and other problems associated with the art by providing a process for making a potassium humate, rock phosphate, sulfur composite granule, the process including: obtaining a sample of a carbonaceous substance comprising humic acid and one or more other substances; contacting the sample with an amount of an alkaline mixture, to form an extraction mixture, the extraction mixture including a sludge component, which includes the sample, and an extraction component (containing predominantly the alkaline mixture); maintaining the sludge component in contact with the extraction component for a period of time sufficient for the extraction component to become relatively enriched in humic acid and the sludge component to become relatively depleted of humic acid; separating the sludge component from the extraction component; spray drying the extraction component, forming a plurality of potassium humate powder particles; obtaining a sulfur powder; combining a rock phosphorous powder, the sulfur powder, and the plurality of potassium humate powder particles, forming a homogenized mixture; and compacting at least a portion of the homogenized mixture under conditions wherein the at least a portion of the homogenized mixture, as a result of the compacting, are made into a form of a granule; thereby making a composite granule comprising potassium humate, rock phosphate, and sulfur.

In some embodiments, the sulfur powder is an elemental sulfur. In other embodiments, the sulfur powder is a sulfur sulfate. In some embodiments, the sulfur powder is about 0.05% to about 50% of the homogenized mixture.

In some embodiments, the composite granule has a pH of at least 2.5. In other embodiments, the composite granule has a pH of 2.5 to about 12. In still other embodiments, the composite granule has a pH of about 7.

In some embodiments, the homogenized mixture further includes combining a dormant microbial community composition. In other embodiments, the homogenized mixture further includes combining zinc sulfate.

In another aspect, a process for making a potassium humate, rock phosphate, sulfur composite granule is described herein, the process including: obtaining a sample of a carbonaceous substance including humic acid and one or more other substances; contacting the sample with an amount of an alkaline mixture, forming an extraction mixture, the extraction mixture including a sludge component that includes, predominantly, the sample, and an extraction component (predominantly, the alkaline mixture); maintaining the sludge component in contact with the extraction component for a period of time sufficient for the extraction component to become relatively enriched in humic acid and the sludge component to become relatively depleted of humic acid; separating the sludge component from the extraction component; spray drying the extraction component, forming a plurality of powder potassium humate particles; obtaining a sulfur powder; combining a rock phosphorous powder, the sulfur powder, and the plurality of potassium humate powder particles, forming a homogenized mixture, where the sulfur powder comprises about 1% to about 50% of the homogenized mixture; and compacting at least a portion of the homogenized mixture under conditions where the at least a portion of the homogenized mixture, as a result of the compacting, are made into a form of a granule; thereby making a composite granule comprising potassium humate, rock phosphate, and sulfur, wherein the co granule has a pH of 2.5 to about 12.

In some embodiments, the plurality of potassium humate powder particles comprises about 3% of the homogenized mixture, where the rock phosphorous powder comprises about 82% of the homogenized mixture, and where the sulfur powder comprises about 15% of the homogenized mixture.

In some embodiments, the sulfur powder is an elemental sulfur. In other embodiments, the sulfur powder is a sulfur sulfate. In some embodiments, the composite granule has a pH of about 7.

In some embodiments, the homogenized mixture further includes combining a dormant microbial community composition. In other embodiments, the homogenized mixture further includes combining zinc sulfate.

In yet another aspect, a potassium humate, rock phosphorous, sulfur powder is described herein, the granule including: a fully soluble potassium humate component comprising about 0.10% to about 20% of the composite granule; a sulfur component comprising about 1% to about 50% of the composite granule; and a rock phosphate powder component comprising about 1% to about 97% of the composite granule; where the composite granule is semi-soluble, and where the composite granule has a pH of 2.5 to about 12.

In some embodiments, the plurality of potassium humate powder particles comprises about 3% of the homogenized mixture, the rock phosphorous powder comprises about 82% of the homogenized mixture, and the sulfur powder comprises about 15% of the homogenized mixture.

In some embodiments, the composite granule further includes a dormant microbial community composition component. In other embodiments, the composite granule further comprises a zinc sulfate component.

DETAILED DESCRIPTION

A process and composition such as is described in various embodiments herein now will be described more fully hereinafter. A process such as is described in various embodiments herein may, however, be embodied in many different forms and should not be construed as limited to the embodiments set forth herein; rather, these embodiments are provided so that this disclosure will be thorough and complete, and will fully convey the scope of a process such as is described in various embodiments herein to those skilled in the art. As used in this specification and the claims, the singular forms "a," "an," and "the" include plural referents unless the context clearly dictates otherwise. When used in this specification and the claims as an adverb rather than a preposition, "about" means "approximately" and comprises the stated value and every value within 10% of that value; in other words, "about 100%" includes 90% and 110% and every value in between.

When used in this specification and the claims, a product is "enriched in humic acid" if the product possesses a higher concentration of humic acid than a raw material from which the product is made. A component becomes "enriched in humic acid" as the concentration of humic acid in the component increases. A component becomes "depleted of humic acid" as the concentration of humic acid in the component decreases.

When used in this specification and the claims, a "carbonaceous substance comprising humic acid and one or more other substances" refers to a carbonaceous substance that contains humic acid and that also contains one or more other substances other than humic acid. An example is Humalite. An example is lignite. An example is Leonardite.

When used in this specification and the claims, a "dormant" microbial organism refers to a period in a microbial organism's life cycle when metabolic activity is temporarily slowed. Microbial organisms may enter a dormant state when stressful conditions are encountered, such as exposure to the cold, nutrient depletion or starvation, or the like. Dormancy is a reversible state, from which a microbial organism can exit and return to its typical metabolic activity. As a non-limiting example, some organisms (e.g. members of the genus *Bacillus*) may form (or be induced to form) endospores when entering a dormant state. Endospores are tough, non-reproductive, structures produced by a bacterium that function to aid the organism's survival. In some instances, endospores may be resistant to ultraviolet radiation, lysosomes, extreme temperatures, nutrient depletion, and/or chemical disinfectants. As a further non-limiting example, organisms may be induced into a dormant state through lyophilization. Lyophilization is the process of freeze-dying microbial organisms, which includes culturing the desired microorganism, suspending the culture in an appropriate lyophilization medium or buffer, and subjecting the suspended culture to a lyophilization process. Lyophilized microorganisms may then be rehydrated at a desired time.

Aspects of a process such as is described in various embodiments herein are further illustrated by the following examples, which are set forth to illustrate certain aspects of a process such as is described in various embodiments herein and are not to be construed as limiting thereof.

In an example, production of a composite granule comprising rock phosphate, potassium humate powder, and sulfur as described herein may be undertaken as a multi-step process. The first general step comprises blending raw material and an alkaline mixture in a blend tank; screening the blended mixture that was made in the blend tank; drying the liquid derived from screening of the blended mixture, thereby forming a fine powder of potassium, humate. In a second general step, this potassium humate powder is combined with a rock phosphorus powder and sulfur powder; this combined powder is then processed to form granules.

In an example, a blending of raw material with an alkaline mixture in a blend tank resulted in extraction of humic acid and other humic substances from the raw material. Hot water and caustic potash solution and Humalite were added to a thermally insulated tank in that order and blended. The hot water was at 160-180 degrees Fahrenheit. The caustic potash solution was 45% membrane grade. The mass ratio of hot water to caustic potash solution to Humalite was 73.7:5.8:20.5.

In an example, water, caustic potash solution and Humalite were placed into a thermally insulated tank to form a 42,000 lb mixture, which was then blended. The liquid phase was sampled, and a colorimetric assay for humic acid was performed on each sample, in which the amount of light absorbed was proportional to the concentration of humic acid.

In an example, a blended mixture prepared according to the paragraph immediately above consisted of liquid and sludge. This blended mixture was then pumped by a 3 HP motor to two 200 mesh screeners at a rate of ~40 gal/min (~350 lbs/min). It took ~120 minutes to screen 42000 lbs. The screener allowed liquids and very small particles to be passed through, but not the insoluble sand, clay and humin fraction, also known as sludge. The amount of sludge varied, but typically the sludge was about 5-7% of the total weight of the blended mixture.

In an example, the sludge still possessed some humic content and was given away to local farmers free of charge. The screened humic acid enriched liquid, which had a density of 8.35-9 lb/gallon, was collected in an insulation tank, which had a capacity of 12500 gal. The humic acid enriched liquid was pumped from the insulation tank to a spray dryer firing tank from which it was transferred to a spray dryer.

In an example, a spray dryer system comprised a burner, a dryer, two cyclone separators, a baghouse and a powder hopper. Humic acid enriched liquid was processed at a rate of 14-16 gal/min. Hydraulic pressure-nozzle atomization was used in which liquid was passed through a filter and then through a hydraulic pressure pump. The pressure of the liquid was directly proportional to the force delivered by the hydraulic pressure pump and was generally 1500 psi but ranged from 1300-1700 psi depending on the moisture of the fine powder. The humic acid enriched liquid was then forced through 8 nozzles to break the liquid into fine droplets. Filtered air was passed through a burner where it was heated to 600-650 degrees Fahrenheit. The temperature of the inlet air never exceeded 800 degrees Fahrenheit. The hot air met the liquid droplets in a co-current manner for a time of about 2 seconds. This time was enough to remove more than 85% of the moisture from the dryer to form a potassium humate powder, which was collected in a common line. The air emerging out of the dryer still had some particles and was generally at 190-205 degrees Fahrenheit and never exceeded 250 degrees Fahrenheit. Heavier particles were collected using two cyclone separators in series and the lighter particles were collected using a baghouse filter. The hot gas, also called flue gas, was then emitted from the bag house; the hot gas consisted mostly of air and steam at 150-180 degrees Fahrenheit. The temperature of the exhaust never exceeded 250 degrees Fahrenheit. The potassium humate powder from the common line was then transferred to a powder hopper. Moisture content of the powder was measured and kept between 11%-13%. When the moisture was below 11%, moisture content was increased in either of two ways, by reducing the temperature of the burner or by operating the hydraulic pressure pump at a higher capacity which in turn increased the flow rate of the liquid. When the moisture was above 13%, moisture content was decreased in either of two ways, by increasing the temperature of the burner or by operating the hydraulic pressure pump at a lower capacity which in turn decreased the flow rate of the liquid. The loose bulk density of the potassium humate powder ranged from about 35 to about 42 pounds per cubic foot. The feed particle size distribution of a typical powder sample was as follows: 1.5% of the particles by weight were less than 100 microns; 15% of the particles by weight were less than 200 microns; 35% of the particles by weight were less than 270 microns; 55% of the particles by weight were less than 400 microns.

Rock phosphate (also known as phosphorite and phosphate rock) is a non-detrital sedimentary rock that containing phosphate material. The specific phosphate content of rock phosphate may vary widely, for example from about 4% to more than 30% phosphorus pentoxide (P2O5). Rock phosphate may also contain calcium carbonate, iron and/or aluminum oxides, and silica.

In an example, the fine potassium humate powder may be homogenized with a rock phosphorous powder and sulfur in a ribbon blender, double cone blender, or V blender, for such a time so as to obtain a fine, completely homogenous blend of potassium humate powder, rock phosphate powder, and sulfur powder.

In some instances, the sulfur may be an elemental sulfur. In some embodiments, the elemental sulfur may in powder or dust form. In other instances, the sulfur may be a sulfur sulfate powder or dust form. The sulfur powder or dust (either elemental sulfur or sulfur sulfate) may then be combined with homogenous blend of potassium humate powder and rock phosphate powder.

In another example, the potassium humate powder may also be homogenized with a dormant microbial community composition powder, rock phosphate powder, and sulfur in a ribbon blender, double cone blender, or V-blender for such a time so as to obtain a fine, completely homogenous blend of potassium humate powder, dormant microbial community composition powder, and rock phosphate powder.

The specific microbial community composition may vary based on the end use of the granule. As a non-limiting example, in some instances in may be desirable to include microbial organisms capable of nitrogen fixation. In other instances, it may be desirable to include microbial organisms capable of solubilizing phosphate. In still other instances, in may be desirable to include organisms capable of bioremediation of the soil. As such, in some circumstances, a commercially available dormant microbial community composition powder may be used; while, in other circumstances, it may be desirable to custom tailor the microbial community composition to the desired end use of the granule. As discussed previously, lyophilization may be used to in order to induce dormancy in the microbial community, microbial community compositions may be lyophilized through use of a shelf lyophilized, a manifold, or any other method of lyophilization known in the art.

In still yet an other example, the potassium humate powder may be homogenized with a rock phosphate powder, sulfur, and a zinc sulfate powder (with or without a dormant microbial community composition powder) in a ribbon blender, double cone blender, or V-blender for such a time so as to obtain a fine, completely homogenous blend of potassium humate, rock phosphate, sulfur, and zinc sulfate powder.

In some instances, zinc deficiencies may be present in up to 50 percent of soils. Zinc deficiencies may be more common when temperatures are lower, such as in the spring; additionally, zinc deficiencies may be more common in soils with a high sand content. Since zinc is an essential component of many metabolic reactions in plants, zinc is a micronutrient necessary to for plants to grow efficiently. Because of its solubility in water, zinc sulfate may be used as a source of zinc in fertilizers.

In an example, conversion of the fine, completely homogenous powder (potassium humate powder, rock phosphate powder, and sulfur (with or without dormant microbial community composition powder and/or zinc sulfate powder)) to form composite granule may be affected by an apparatus comprising a mechanical roller compactor, with pocket rollers at 8 rpm rotation and 1700 psi. Conventionally, the granulation process has required conditions not conducive to the survival of various microorganisms (e.g. high temperatures). In contrast, the process described herein results in the survival of the dormant microbial community composition, such that the organism may be rehydrated and return to typical metabolic activity.

Compacted composite granules are screened by means of a vibratory screener to achieve relative uniformity of size distribution. For example, composite granules of 2.0 mm-4.0 mm were prepared for various agricultural uses, and composite granules of 0.8 mm-2.0 mm were prepared for turf or horticultural use. Resulting composite granules allow for easy transport, as well as application in dry farming systems.

Resulting composite granules are semi-soluble, meaning they partially dissolve in water (e.g. rainwater in dry farming applications) and have been found to aid plant growth in both agricultural and horticultural applications.

Resulting granules have been found to aid plant growth in both agricultural, turf and horticultural applications. Various soil bacteria may convert the inert and insoluble phosphoric acid and in combination with elemental sulfur (or sulfur sulfate) present in the granule to sulfate, and in turn sulfuric acid. For example, in calcareous soils, this sulfuric acid may cause fixed calcium carbonates and free lime to release calcium in soil solution, while the potassium humate (fully water-soluble humic acid) may alter the rhizodeposition and plant roots. This may result in a metamorphosis of overall root architecture, provide more root hair, and translocate the exchangeable calcium to the plant roots and plant tissues. The potassium humate also may simultaneously buffer, chelate, and complex macro-micronutrients, making them more readily available to roots and plants. Furthermore, due to its nanoparticle size the potassium humate may create micropores for roots, water, and nutrients to reside, which may become oxygenated as a result of the dynamics of soil physics. Traditionally, about 70% to about 90% of sulfur present in soil is in the form of organic matter, which must be converted to sulfate by soil bacteria in order to be usable by plants. The combination of the potassium humate and sulfur may enhance the conversion of sulfur to sulfate, resulting in a conversion rate from about 15% to about 70%. The conversation rate may be contingent upon dynamics such as soil temperature, moisture, and/or presence of autotropic bacteria. In another example, where the soil is sandy, irrigated, or has high rainfall amounts, the slow release of sulfur may create sulfate for immediate plant use (approximately 30%), while the remainder of the sulfur is activated to create sulfates and sulfuric acids in a long lasting manner with minimal leaching, which may ensure further sulfate formation at various stages of plant growth.

In another example, the application of potassium humate, rock phosphate, sulfur composite granules in conjunction with the nitrogen may enhance nitrogen to sulfur ratios in crops where the protein requirements are high. Such enhancement may be attributable to the creation of desirable soil texture and structure by the organosulfur complexes created by the application of the composite granules to the soil. For example, the organosulfur complexes may loosen soil in tied clay soils creating adequate drainage, suitable aeration, and buffering properties. The creation of these organosulfur complexes may also result in, through various chemical pathways and the labyrinthine network of microorganisms, the decomposition of high molecular weight of organic materials, which may create up to 5,000 calories per gram of energy available for plant use.

The composite granules described herein may have a number of beneficial effects on the soil. These benefits may include, but are not limited to: an improvement in soil structure; altering the soil biochemistry in order to support microbial activity; allowing for increased water retention and/or availability; increasing the buffering capability and nutrient management capability; providing an available source of phosphoric acid for immediate plant uptake; providing basic mineral elements for plant nutrient availability and uptake; providing elemental and sulfate-based macronutrients and micronutrients for positively influence root zone; managing high soil pH levels; and provide biologically-active spores to enhance the efficient of nitrogen and phosphate use. It is to be understand that aforementioned benefits are merely exemplary. Furthermore, it is also to be understood that every composite granule described herein may not have every exemplary benefit described.

Aspects of a process such as is described in various embodiments herein are further illustrated by the following further examples, which are set forth to illustrate certain aspects of a process such as is described in various embodiments herein and are not to be construed as limiting thereof.

Further Example 1

A process for making a potassium humate, rock phosphate, sulfur composite granule, the process comprising:
  obtaining a sample of a carbonaceous substance comprising humic acid and one or more other substances;
  contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
  maintaining the sludge component in contact with the extraction component for a period of time sufficient for the extraction component to become relatively enriched in humic acid and the sludge component to become relatively depleted of humic acid;
  separating the sludge component from the extraction component;
  spray drying the extraction component, thereby forming a plurality of potassium humate powder particles;
  obtaining a sulfur powder;
  combining a rock phosphorous powder, the sulfur powder, and the plurality of potassium humate powder particles, thereby forming a homogenized mixture; and
  compacting at least a portion of the homogenized mixture under conditions wherein the at least a portion of the homogenized mixture, as a result of the compacting, are made into a form of a granule;
  thereby making a composite granule comprising potassium humate, rock phosphate, and sulfur.

Further Example 2

A process according to further example 1, wherein the carbonaceous substance comprises a coal and/or a claystone and/or a mudstone and/or a shale.

Further Example 3

A process according to further example 1, wherein the carbonaceous substance comprises a lignite and/or a Leonardite and/or a Humalite.

Further Example 4

A process according to further example 1, wherein the carbonaceous substance comprises a Humalite.

Further Example 5

A process according to further example 1, wherein the alkaline mixture comprises water.

Further Example 6

A process according to further example 1, wherein the alkaline mixture comprises a base.

Further Example 7

A process according to further example 1, wherein the alkaline mixture comprises sodium hydroxide or potassium hydroxide.

Further Example 8

A process according to further example 1, wherein the alkaline mixture comprises caustic potash solution.

Further Example 9

A process according to further example 1, wherein the alkaline mixture comprises, by mass, between about 10 and about 15 parts water, and about 1 part caustic potash solution, wherein the caustic potash solution is 45% membrane grade.

Further Example 10

A process according to further example 1, wherein the alkaline mixture comprises, by mass, about 73.7 parts water and about 5.8 parts caustic potash solution, wherein the caustic potash solution is 45% membrane grade.

Further Example 11

A process according to further example 1, wherein the mass ratio of the alkaline mixture to the sample is between about 75:25 and about 84:16.

Further Example 12

A process according to further example 1, wherein the mass ratio of the alkaline mixture to the sample is between about 78:22 and about 81:13.

Further Example 13

A process according to further example 1, wherein the mass ratio of the alkaline mixture to the sample is about 79.5:20.5.

Further Example 14

A process according to further example 1, wherein the sludge component is maintained in contact with the extraction component for between about 4 hours and about 12 hours.

Further Example 15

A process according to further example 1, wherein the sludge component is maintained in contact with the extraction component for between about 6 hours and about 10 hours.

Further Example 16

A process according to further example 1, wherein the sludge component is maintained in contact with the extraction component for about 8 hours.

Further Example 17

A process according to further example 1, wherein the sludge component is maintained in contact with the extraction component for a period of time sufficient for the extraction component to possess a humic acid content of at least about 6%.

Further Example 18

A process according to further example 1, wherein the sludge component is maintained in contact with the extraction component for a period of time sufficient for the extraction component to possess a humic acid content of at least about 14%.

Further Example 19

A process according to further example 1, wherein the sludge component is maintained in contact with the extraction component for a period of time sufficient for the extraction component to possess a humic acid content of at least about 17%.

Further Example 20

A process according to further example 1, wherein the sludge component is maintained in contact with the extraction component for a period of time sufficient for the extraction component to possess a humic acid content of at least about 18%.

Further Example 21

A process according to further example 1, wherein the separating is effected by filtration.

Further Example 22

A process according to further example 1, wherein the separating is effected by sedimentation.

Further Example 23

A process according to further example 1, wherein the drying is effected by spray drying.

Further Example 24

A process according to further example 1, wherein the drying is effected by spray drying, and wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit.

Further Example 25

A process according to further example 1, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further Example 26

A process according to further example 1, wherein the plurality of potassium humate powder particles is characterized by a moisture content between about 9% and about 15%.

Further Example 27

A process according to further example 1, wherein the plurality of potassium humate powder particles is characterized by a moisture content between about 10% and about 14%.

Further Example 28

A process according to further example 1, wherein the plurality of potassium humate powder particles is characterized by a moisture content between about 11% and about 13%.

Further Example 29

A process according to further example 1, wherein the plurality of potassium humate powder particles is characterized by a loose bulk density, and wherein the loose bulk density is between about 28 and about 49 pounds per cubic foot.

Further Example 30

A process according to further example 1, wherein the plurality of potassium humate powder particles is characterized by a loose bulk density, and wherein the loose bulk density is between about 31.5 and about 45.5 pounds per cubic foot.

Further Example 31

A process according to further example 1, wherein the plurality of potassium humate powder particles is characterized by a loose bulk density, and wherein the loose bulk density is between about 35 and about 42 pounds per cubic foot.

Further Example 32

A process according to further example 1, wherein the plurality of potassium humate powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further Example 33

A process according to further example 1, wherein the rock phosphorous powder includes about 15% to about 30% phosphorous pentoxide, about 30% to about 60% calcium carbonate, and about 10% to about 20% silica.

Further Example 34

A process according to further example 1, wherein the sulfur powder is obtained from elemental sulfur or sulfur sulfate.

Further Example 35

A process according to further example 1, wherein the obtaining the sulfur includes obtaining sulfur sulphate powder/dust or elemental sulfur powder/dust.

Further Example 36

A process according to further example 35, wherein the sulfur powder/dust may be filtered, and the filter size may be a 140 mesh filter, a 230 mesh filter, a 270 mesh filter, a 325 mesh filter, or a 400 mesh filter.

Further Example 37

A process according to further example 1, wherein the homogenized mixture includes between about 1% sulfur and about 50% sulfur.

Further Example 38

A process according to further example 1, wherein the homogenized mixture includes about 3% potassium humate powder, about 15% sulfur powder, and about 82% rock phosphate powder.

Further Example 39

A process according to further example 1, wherein the composite granule has a pH of at least 2.5.

Further Example 40

A process according to further example 1, wherein the composite granule has a pH between about 2.5 and about 12.

Further Example 41

A process according to further example 1, wherein the composite granule has a pH of about 7.

Further Example 42

A process according to further example 1, wherein the homogenized mixture further includes a microbial community composition powder thereby forming a powder combination.

Further Example 43

A process according to further example 42, wherein the microbial composition comprises a plurality of microorganisms in a dormant state.

Further Example 44

A process according to further example 42, wherein the microbial community composition comprises a lyophilized microbial powder.

Further Example 45

A process according to further example 42, wherein the microbial composition comprises a plurality of microorganisms in an endosporic state.

Further Example 46

A process according to further example r2, wherein the microbial community composition includes at least one species selected from the group of genera consisting of: *Acetobacter, Agrobacterium, Aquifex, Arthrobacter, Azoarcus, Azorhizobium, Azospirillum, Azotobacter, Bacillus, Beijerinckia, Burkholderia, Chlorobium, Chloroflexus, Chryseobacterium, Enterococcus, Escherichia, Flavobacterium, Flexibacter, Frankia, Gloeobacter, Gluconacetobacter, Halobacterium, Herbaspirillum, Lactobacillus, Leptonema, Mycobacterium, Paenibacillus, Phyllobacterium, Planctomyces, Pseudomonas, Rhizobia, Rhizobium, Rickettsia, Rhodocyclus, Sinorhizobium, Sphingomonas, Streptomyces, Synechococcus Thermotoga, Thermus*, and *Trichoderma*.

Further Example 47

A process according to further example 42, wherein the microbial community composition includes at least one of *Bacillus megaterium, Bacillus linchenformis, Bacillus amyloliquefaciens, Bacillus methylotrophicus, Bacillus pumilus, Pseudomonas flourescens, Pseudomonas putida, Pseudomonas striata*, and/or *Pseudomonas aeruginosa*.

Further Example 48

A process according to further example 42, wherein the microbial community composition includes at least one methylotrophic species. Methylotrophs are a diverse group of microorganisms (including both bacteria and yeast) that may metabolize and use reduced one-carbon composites (e.g. methanol or methane) as their carbon source. Methylotrophs may also use multi-carbon compositions containing no carbon-carbon bonds (e.g. dimethyl ether, dimethylamine, etc.). Methylotrophs are key players in the carbon cycle, uptaking methane and other greenhouse gases. Additionally, methylotrophs are capable of forming mutualistic relationships with several plant species, and providing provide plants nutrients, such as soluble phosphorus and fixed nitrogen.

Further Example 49

A process according to further example 42, wherein the rock phosphorous powder, the plurality of potassium humate powder particles, and optionally, microbial community composition powder are also combined with a zinc sulfate powder thereby forming a homogenized mixture.

Further Example 50

A process according to example 1, 42, or 49, wherein the compacting of the powder combination is effected by an apparatus comprising a roller compactor.

Further Example 51

A process according to further example 1, 42, or 49, wherein the compacting is effected by an apparatus comprising a roller compactor, and wherein the speed of the roller compactor is about 5 rpm to about 40 rpm.

Further Example 52

A process according to further example 1, 42, or 49, wherein the compacting is effected by an apparatus comprising a roller compactor, and wherein the pressure exerted by the roller compactor is about 1000 psi to about 3,000 psi.

Further Example 53

A process according to further example 1, 42, or 49, wherein the compacting is effected by an apparatus comprising a roller compactor, wherein the speed of the roller compactor is about 8 rpm, and wherein the pressure exerted by the roller compactor is about 1,000 psi and about 3,000 psi.

Further Example 54

A process according to further example 1, 42, or 49, wherein the compacting is effected by an apparatus comprising a roller compactor, wherein the speed of the roller compactor is about 8 rpm, wherein the pressure exerted by the roller compactor is about 1,000 psi and about 3,000 psi, and wherein the temperature does not exceed about 130 degrees Fahrenheit.

Further Example 55

A process according to further example 42 or 49, wherein the compacting conditions do not denature at least a portion of the microbial community composition.

Further Example 56

A process according to further example 42 or 49, wherein at least a portion of the microbial community composition within the composite granule includes a plurality of dormant microbial spores that may be rehydrated to resume non-dormant metabolic activities.

Further Example 57

A process according to further example 42 or 49, wherein the resulting composite granule containing about 0.5 pounds to about 10 pounds of dormant microbial spores comprising the microbial community composition per ton of homogenized mixture.

Further Example 58

A process according to further example 42 or 49, wherein in some instances, the dormant microbial spores comprising the microbial community composition may be mixed with a carrier (e.g. calcium carbonate) prior to being homogenized with the other powders. In such instances, the dormant microbial spores would still only be about 0.5 pounds to about 10 pounds per ton of homogenized mixture regardless of the amount of carrier used.

Further Example 59

A process according to further example 1, 42, or 49, wherein the composite granule is between about 0.5 mm and about 4.5 mm.

Further Example 60

A process according to further example 1, 42, or 49, wherein the composite granule is between about 0.8 mm and about 4.0 mm.

Further Example 61

A process according to further example 1, 42, or 49, wherein the composite granule is between about 0.8 mm and about 2.0 mm.

Further Example 62

A process according to further example 1, 42, or 49, wherein the composite granule is between about 2.0 mm and about 4.0 mm.

Further Example 63

A process for making a potassium humate, rock phosphate, sulfur composite granule, the process comprising:
  obtaining a sample of a carbonaceous substance comprising humic acid and one or more other substances;
  contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
  maintaining the sludge component in contact with the extraction component for a period of time sufficient for the extraction component to become relatively enriched in humic acid and the sludge component to become relatively depleted of humic acid;
  separating the sludge component from the extraction component;
  spray drying the extraction component, thereby forming a plurality of powder potassium humate particles;
  obtaining a sulfur powder;
  combining a rock phosphorous powder, the sulfur powder, and the plurality of potassium humate powder particles, thereby forming a homogenized mixture,
    wherein the sulfur comprises about 1% to about 50% of the homogenized mixture; and
  compacting at least a portion of the homogenized mixture under conditions wherein the at least a portion of the homogenized mixture, as a result of the compacting, are made into a form of a granule;
  thereby making a composite granule comprising potassium humate, rock phosphate, and sulfur, wherein the composite granule has a pH of 2.5 to about 12.

Further Example 64

A process according to further example 63, wherein the carbonaceous substance comprises a coal and/or a claystone and/or a mudstone and/or a shale.

Further Example 65

A process according to further example 63, wherein the carbonaceous substance comprises a lignite and/or a Leonardite and/or a Humalite.

Further Example 66

A process according to further example 63, wherein the carbonaceous substance comprises a Humalite.

Further Example 67

A process according to further example 63, wherein the alkaline mixture comprises water.

Further Example 68

A process according to further example 63, wherein the alkaline mixture comprises a base.

Further Example 69

A process according to further example 63, wherein the alkaline mixture comprises sodium hydroxide or potassium hydroxide.

Further Example 70

A process according to further example 63, wherein the alkaline mixture comprises caustic potash solution.

Further Example 71

A process according to further example 63, wherein the alkaline mixture comprises, by mass, between about 10 and about 15 parts water, and about 1 part caustic potash solution, wherein the caustic potash solution is 45% membrane grade.

Further Example 72

A process according to further example 63, wherein the alkaline mixture comprises, by mass, about 73.7 parts water and about 5.8 parts caustic potash solution, wherein the caustic potash solution is 45% membrane grade.

Further Example 73

A process according to further example 63, wherein the mass ratio of the alkaline mixture to the sample is between about 75:25 and about 84:16.

Further Example 74

A process according to further example 63, wherein the mass ratio of the alkaline mixture to the sample is between about 78:22 and about 81:13.

Further Example 75

A process according to further example 63, wherein the mass ratio of the alkaline mixture to the sample is about 79.5:20.5.

Further Example 76

A process according to further example 63, wherein the sludge component is maintained in contact with the extraction component for between about 4 hours and about 12 hours.

Further Example 77

A process according to further example 63, wherein the sludge component is maintained in contact with the extraction component for between about 6 hours and about 10 hours.

Further Example 78

A process according to further example 63, wherein the sludge component is maintained in contact with the extraction component for about 8 hours.

Further Example 79

A process according to further example 63, wherein the sludge component is maintained in contact with the extraction component for a period of time sufficient for the extraction component to possess a humic acid content of at least about 6%.

Further Example 80

A process according to further example 63, wherein the sludge component is maintained in contact with the extraction component for a period of time sufficient for the extraction component to possess a humic acid content of at least about 14%.

Further Example 81

A process according to further example 63, wherein the sludge component is maintained in contact with the extraction component for a period of time sufficient for the extraction component to possess a humic acid content of at least about 17%.

Further Example 82

A process according to further example 63, wherein the sludge component is maintained in contact with the extraction component for a period of time sufficient for the extraction component to possess a liquid humic acid content of at least about 18%.

Further Example 83

A process according to further example 63, wherein the separating is effected by filtration.

Further Example 84

A process according to further example 63, wherein the separating is effected by sedimentation.

Further Example 85

A process according to further example 63, wherein the drying is effected by spray drying.

Further Example 86

A process according to further example 63, wherein the drying is effected by spray drying, and wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit.

Further Example 87

A process according to further example 63, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further Example 88

A process according to further example 63, wherein the plurality of potassium humate powder particles is characterized by a moisture content, and wherein the moisture content is between about 9% and about 15%.

Further Example 89

A process according to further example 63, wherein the plurality of potassium humate powder particles is characterized by a moisture content, and wherein the moisture content is between about 10% and about 14%.

Further Example 90

A process according to further example 63, wherein the plurality of potassium humate powder particles is characterized by a moisture content, and wherein the moisture content is between about 11% and about 13%.

Further Example 91

A process according to further example 63, wherein the plurality of potassium humate powder particles is characterized by a loose bulk density, and wherein the loose bulk density is between about 28 and about 49 pounds per cubic foot.

Further Example 92

A process according to further example 63, wherein the plurality of potassium humate powder particles is characterized by a loose bulk density, and wherein the loose bulk density is between about 31.5 and about 45.5 pounds per cubic foot.

Further Example 93

A process according to further example 63, wherein the plurality of potassium humate powder particles is characterized by a loose bulk density, and wherein the loose bulk density is between about 35 and about 42 pounds per cubic foot.

Further Example 94

A process according to further example 63, wherein the plurality of potassium humate powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further Example 95

A process according to further example 63, wherein the rock phosphorous powder includes about 15% to about 30% phosphorous pentoxide, about 30% to about 60% calcium carbonate, and about 10% to about 20% silica.

Further Example 96

A process according to further example 63, wherein the sulfur powder is obtained from elemental sulfur or sulfur sulfate.

Further Example 97

A process according to further example 63, wherein the obtaining the sulfur including obtaining sulfate powder/dust or elemental sulfur powder/dust.

Further Example 98

A process according to further example 63, wherein the homogenized mixture includes about 3% potassium humate powder, about 15% sulfur powder, and about 82% rock phosphate powder.

Further Example 99

A process according to further example 63, wherein the composite granule has a pH of about 7.

Further Example 100

A process according to further example 63, wherein the homogenized mixture further includes a microbial community composition powder thereby forming a powder combination.

Further Example 101

A process according to further example 100, wherein the microbial composition comprises a plurality of microorganisms in a dormant state.

Further Example 102

A process according to further example 100, wherein the microbial community composition comprises a lyophilized microbial powder.

Further Example 103

A process according to further example 100, wherein the microbial composition comprises a plurality of microorganisms in an endosporic state.

Further Example 104

A process according to further example 100, wherein the microbial community composition includes at least one species selected from the group of genera consisting of: *Acetobacter, Agrobacterium, Aquifex, Arthrobacter, Azoarcus, Azorhizobium, Azospirillum, Azotobacter, Bacillus, Beijerinckia, Burkholderia, Chlorobium, Chloroflexus, Chryseobacterium, Enterococcus, Escherichia, Flavobacterium, Flexibacter, Frankia, Gloeobacter, Gluconacetobacter, Halobacterium, Herbaspirillum, Lactobacillus, Leptonema, Mycobacterium, Paenibacillus, Phyllobacterium, Planctomyces, Pseudomonas, Rhizobia, Rhizobium, Rickettsia, Rhodocyclus, Sinorhizobium, Sphingomonas, Streptomyces, Synechococcus Thermotoga, Thermus,* and *Trichoderma.*

Further Example 105

A process according to further example 100, wherein the microbial community composition includes at least one of *Bacillus megaterium, Bacillus linchenformis, Bacillus amyloliquefaciens, Bacillus methylotrophicus, Bacillus pumilus, Pseudomonas flourescens, Pseudomonas putida, Pseudomonas striata,* and/or *Pseudomonas aeruginosa.*

Further Example 106

A process according to further example 100, wherein the microbial community composition includes at least one methylotrophic species. Methylotrophs are a diverse group of microorganisms (including both bacteria and yeast) that may metabolize and use reduced one-carbon composites (e.g. methanol or methane) as their carbon source. Methylotrophs may also use multi-carbon compositions containing no carbon-carbon bonds (e.g. dimethyl ether, dimethylamine, etc.). Methylotrophs are key players in the carbon cycle, uptaking methane and other greenhouse gases. Additionally, methylotrophs are capable of forming mutualistic relationships with several plant species, and providing provide plants nutrients, such as soluble phosphorus and fixed nitrogen.

Further Example 107

A process according to further example 100, wherein the rock phosphorous powder, the plurality of potassium humate powder particles, and optionally, microbial community composition powder are also combined with a zinc sulfate powder thereby forming a homogenized mixture.

Further Example 108

A process according to example 63, 100, or 107, wherein the compacting of the powder combination is effected by an apparatus comprising a roller compactor.

Further Example 109

A process according to further example 63, 100, or 107, wherein the compacting is effected by an apparatus comprising a roller compactor, and wherein the speed of the roller compactor is about 5 rpm to about 40 rpm.

Further Example 110

A process according to further example 63, 100, or 107, wherein the compacting is effected by an apparatus comprising a roller compactor, and wherein the pressure exerted by the roller compactor is about 1,000 psi to about 3,000 psi.

Further Example 111

A process according to further example 63, 100, or 107, wherein the compacting is effected by an apparatus comprising a roller compactor, wherein the speed of the roller compactor is about 5 rpm to about 40 rpm, and wherein the pressure exerted by the roller compactor is about 1,000 psi to about 3,000 psi.

Further Example 112

A process according to further example 63, 100, or 107, wherein the compacting is effected by an apparatus comprising a roller compactor, wherein the speed of the roller compactor is about 5 rpm to about 40 rpm, wherein the pressure exerted by the roller compactor is about 1,000 psi to about 3,000 psi, and wherein the temperature does not exceed about 130 degrees Fahrenheit.

Further Example 113

A process according to further example 100 or 107, wherein the compacting conditions do not denature at least a portion of the microbial community composition.

Further Example 114

A process according to further example 100 or 107, wherein at least a portion of the microbial community composition within the composite granule is dormant and may be rehydrated to resume non-dormant metabolic activities.

Further Example 115

A process according to further example 100 or 107, wherein the resulting composite granule containing about 0.5 pounds to about 10 pounds of dormant microbial spores comprising the microbial community composition per ton of homogenized mixture.

Further Example 116

A process according to further example 100 or 107, wherein in some instances, the dormant microbial spores comprising the microbial community composition may be mixed with a carrier (e.g. calcium carbonate) prior to being homogenized with the other powders. In such instances, the dormant microbial spores would still only be about 0.5 pounds to about 10 pounds per ton of homogenized mixture regardless of the amount of carrier used.

Further Example 117

A process according to further example 63, 100, or 107, wherein the composite granule is between about 0.5 mm and about 4.5 mm.

Further Example 118

A process according to further example 63, 100, or 107, wherein the composite granule is between about 0.8 mm and about 4.0 mm.

Further Example 119

A process according to further example 63, 100, or 107, wherein the composite granule is between about 0.8 mm and about 2.0 mm.

Further Example 120

A process according to further example 63, 100, or 107, wherein the composite granule is between about 2.0 mm and about 4.0 mm.

Aspects of a composite granule illustrated by the following further examples, which are set forth to illustrate certain aspects of a process such as is described in various embodiments herein and are not to be construed as limiting thereof.

Further Example 121

A potassium humate, rock phosphorous, sulfur composite granule, the granule comprising:
  a fully soluble potassium humate component comprising about 0.10% to about 20% of the composite granule;
  a sulfur component comprising about 1% to about 50% of the composite granule; and
  a rock phosphate powder component comprising about 1% to about 97% of the composite composite;
  wherein composite granule is semi-soluble, and
  wherein the composite granule has a pH of about 2.5 to about 12.

Further Example 122

A composite granule according to further example 121, wherein the rock phosphorous powder includes about 15% to about 30% phosphorous pentoxide, about 30% to about 60% calcium carbonate, and about 10% to about 20% silica.

Further Example 123

A composite granule according to further example 121, wherein the plurality of potassium humate powder particles comprises about 3% of the homogenized mixture, wherein the rock phosphorous powder comprises about 82% of the homogenized mixture, and wherein the sulfur powder comprises about 15% of the homogenized mixture.

Further Example 124

A composite granule according to further example 121, wherein the homogenous powder combination further includes a dormant microbial community composition powder comprising about 0.0025% to about 20% of the homogenous powder.

Further Example 125

A composite granule according to further example 124, wherein the plurality of dormant microbial organisms includes at least one species selected from the group of genera consisting of: *Acetobacter, Agrobacterium, Aquifex, Arthrobacter, Azoarcus, Azorhizobium, Azospirillum, Azotobacter, Bacillus, Beijerinckia, Burkholderia, Chlorobium, Chloroflexus, Chryseobacterium, Enterococcus, Escherichia, Flavobacterium, Flexibacter, Frankia, Gloeobacter, Gluconacetobacter, Halobacterium, Herbaspirillum, Lactobacillus, Leptonema, Mycobacterium, Paenibacillus, Phyllobacterium, Planctomyces, Pseudomonas, Rhizobia, Rhizobium, Rickettsia, Rhodocyclus, Sinorhizobium, Sphingomonas, Streptomyces, Synechococcus Thermotoga, Thermus*, and *Trichoderma*.

Further Example 126

A composite granule according to further example 124, wherein the microbial community composition includes at least one of *Bacillus megaterium, Bacillus linchenformis, Bacillus amyloliquefaciens, Bacillus methylotrophicus, Bacillus pumilus, Pseudomonas flourescens, Pseudomonas putida, Pseudomonas striata*, and/or *Pseudomonas aeruginosa*.

Further Example 127

A composite granule according to further example 124, wherein the microbial community composition includes at least one methylotrophic species.

Further Example 128

A composite granule according to further example 124, wherein the microbial community composition powder includes a lyophilized microbial powder.

Further Example 129

A composite granule according to further example 124, wherein at least of a portion of the plurality of dormant microbial organisms within the composite granule may be rehydrated for use.

Further Example 130

A composite granule according to further example 121, wherein the homogenous powder combination further includes a zinc sulfate powder comprising about 0.001% to about 50% of the homogenous powder.

Further Example 131

A composite granule according to further example 121, wherein the composite granule is between about 0.5 mm and about 4.5 mm.

Further Example 132

A composite granule according to further example 121, wherein the composite granule is between about 0.8 mm and about 4.0 mm.

Further Example 133

A composite granule according to further example 121, wherein the composite granule is between about 0.8 mm and about 2.0 mm.

Further Example 134

A composite granule according to further example 121, wherein the composite granule is between about 2.0 mm and about 4.0 mm.

Further Example 135

A composite granule according to further example 121, wherein the composite granule is solubilized thereby forming a partially solubilized solution and applying the partially solubilized solution to a desired location.

Many modifications and other embodiments of a process such as is described in various embodiments herein will come to mind to one skilled in the art to which this disclosed process pertains having the benefit of the teachings presented in the foregoing description. Therefore, it is to be understood that a process such as is described in various embodiments herein is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A process for making a potassium humate, rock phosphate, sulfur composite granule, the process comprising:
    obtaining a sample of a carbonaceous substance comprising humic acid and one or more other substances;
    contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
    maintaining the sludge component in contact with the extraction component for a period of time sufficient for the extraction component to become relatively enriched in humic acid and the sludge component to become relatively depleted of humic acid;
    separating the sludge component from the extraction component;
    spray drying the extraction component, thereby forming a plurality of potassium humate powder particles, wherein the plurality of potassium humate powder particles is characterized by a moisture content between about 9% and about 15%;
    obtaining a sulfur powder;
    combining a rock phosphorous powder, the sulfur powder, and the plurality of potassium humate powder particles, thereby forming a homogenized mixture; and
    compacting at least a portion of the homogenized mixture under conditions wherein the at least a portion of the homogenized mixture, as a result of the compacting, are made into a form of a granule;
    thereby making a composite granule comprising potassium humate, rock phosphate, and sulfur.

2. The process of claim 1, wherein the sulfur powder is an elemental sulfur.

3. The process of claim 1, wherein the sulfur powder is a sulfate.

4. The process of claim 1, wherein the sulfur powder is about 0.05% to about 50% of the homogenized mixture.

5. The process of claim 1, wherein the composite granule has a pH of at least 2.5.

6. The process of claim 5, wherein the composite granule has a pH of 2.5 to about 12.

7. The process of claim 6, wherein the composite granule has a pH of about 7.

8. The process of claim 1, wherein the homogenized mixture further includes combining a dormant microbial community composition.

9. The process of claim 1, wherein the homogenized mixture further includes combining zinc sulfate.

10. A process for making a potassium humate, rock phosphate, sulfur composite granule, the process comprising:
    obtaining a sample of a carbonaceous substance comprising humic acid and one or more other substances;
    contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;

maintaining the sludge component in contact with the extraction component for a period of time sufficient for the extraction component to become relatively enriched in humic acid and the sludge component to become relatively depleted of humic acid;

separating the sludge component from the extraction component;

spray drying the extraction component, thereby forming a plurality of powder potassium humate particles, wherein the plurality of potassium humate powder particles is characterized by a moisture content between about 9% and about 15%;

obtaining a sulfur powder;

combining a rock phosphorous powder, the sulfur powder, and the plurality of potassium humate powder particles, thereby forming a homogenized mixture,
wherein the sulfur powder comprises about 1% to about 50% of the homogenized mixture; and compacting at least a portion of the homogenized mixture under conditions wherein the at least a portion of the homogenized mixture, as a result of the compacting, are made into a form of a granule;

thereby making a composite granule comprising potassium humate, rock phosphate, and sulfur, wherein the composite granule has a pH of 2.5 to about 12.

11. The process of claim 10, wherein the plurality of potassium humate powder particles comprises about 3% of the homogenized mixture, wherein the rock phosphorous powder comprises about 82% of the homogenized mixture, and wherein the sulfur powder comprises about 15% of the homogenized mixture.

12. The process of claim 10, wherein the sulfur powder is an elemental sulfur.

13. The process of claim 10, wherein the sulfur powder is a sulfate.

14. The process of claim 10, wherein the composite granule has a pH of about 7.

15. The process of claim 10, wherein the homogenized mixture further includes combining a dormant microbial community composition.

16. The process of claim 10, wherein the homogenized mixture further includes combining zinc sulfate.

* * * * *